(12) United States Patent
Ozawa

(10) Patent No.: US 6,463,957 B2
(45) Date of Patent: Oct. 15, 2002

(54) CONNECTOR HAVING A LOCKING MEMBER

(75) Inventor: Toshihiko Ozawa, Gyoda (JP)

(73) Assignee: Surpass Industry Co. Ltd., Gyoda (JP)

( * ) Notice: Subject to any disclaimer, the term of this patent is extended or adjusted under 35 U.S.C. 154(b) by 0 days.

(21) Appl. No.: 09/863,677

(22) Filed: May 22, 2001

(65) Prior Publication Data

US 2001/0052366 A1 Dec. 20, 2001

(30) Foreign Application Priority Data

Jun. 12, 2000 (JP) ........................................ 2000-176028

(51) Int. Cl.[7] ................................................ F16L 37/32
(52) U.S. Cl. ................... 137/614.04; 137/614; 141/351
(58) Field of Search ............................ 137/614, 614.04, 137/614.03; 222/400.7; 141/351

(56) References Cited

U.S. PATENT DOCUMENTS

| | | | | |
|---|---|---|---|---|
| 4,344,455 A | * | 8/1982 | Norton et al. ........... | 137/614 X |
| 5,108,015 A | * | 4/1992 | Rauworth et al. ....... | 222/400.7 |
| 5,971,019 A | * | 10/1999 | Imai ....................... | 137/614.04 |
| 6,286,730 B1 | * | 9/2001 | Amidzich ................ | 222/400.7 |

* cited by examiner

Primary Examiner—Kevin Lee
(74) Attorney, Agent, or Firm—Kolisch Hartwell Dickinson McCormack & Heuser

(57) ABSTRACT

A connector 20 comprises a plug 21 fitted to an opening 2 formed in a container 1, and a socket 22 which is connected to the plug 21. The plug 21 comprises a bracket section 3 which is fitted into the opening 2 of the container 1, and a plug section 23 which is screwed into a threaded aperture 4 formed in the bracket section 3. An annular locking ring 63 formed with lugs 66 on the outer periphery is integrally but removably fitted to the plug section 23 which is threadedly attached to the threaded aperture 4. A plurality of engaging ribs 67 are formed on the inner peripheral face of the bracket section 3 for preventing rotation of the plug section 23 by engaging with the lugs 66 of the locking ring 63 which is fitted to the plug section 23. As a result, loosening from the threaded aperture 4 of the reusable plug section 23 which is removable by threading into the threaded aperture 4 of the bracket section 3, is prevented so that leaking of the liquid inside the container 1 from a loosened part is prevented.

20 Claims, 6 Drawing Sheets

CONNECTOR HAVING A LOCKING MEMBER

FIELD OF THE INVENTION

The present invention relates to a connector which is fitted for example to a container for containing a liquid such as semiconductor high purity chemicals or general chemicals.

BACKGROUND OF THE INVENTION

Heretofore, a connector is fitted to an opening of a container which contains a liquid such as semiconductor high purity chemicals or general chemicals, and a hose for guiding and discharging liquid to the outside is connected by means of this connector.

As this type of connector, there is known a device having a connectable plug and socket which are fitted to each other by one touch.

However, this one touch type connector has a precision construction, and uses synthetic resin having excellent chemical resistance, resulting in high cost. Hence it is desirable to remove this from the container after use for reuse.

Therefore, as shown in FIG. 9, this is divided into a bracket section 3 which is threadedly fitted to a female thread formed in an opening 2 of a container 1, and a plug section 5 which is threadedly secured to a threaded aperture 4 formed in the center of the bracket section 3, so that the plug section 5 of precision construction can be detached from the bracket section 3 for reuse.

However, with this construction where the plug section 5 is simply threadedly fitted to the threaded aperture 4 of the bracket section 3 in this manner, there is the possibility of the plug section 5 becoming loose, so that the liquid inside the container 1 can leak from the loosened part.

Consequently, it is an object of the present invention to provide a connector where there is no possibility of the plug section attached to the bracket section becoming loose so that liquid leaks out.

SUMMARY OF THE INVENTION

The connector of the present invention has; a bracket section formed with a threaded aperture, a plug section threaded into the threaded aperture of the bracket section, a socket connected to the bracket section for communicating associated passages, and a locking member removably fitted between the bracket section and the plug section for preventing rotation of the plug section with respect to the bracket section with the plug section threaded into the threaded aperture.

Then, according to the above mentioned invention, in a construction where, so that the high cost plug section can be reused, the plug section connected to the socket is attached or removed by being screwed into the threaded aperture of the bracket section, since the locking member for preventing rotation with respect to the bracket section with the plug section screwed into the threaded aperture is removably fitted, then by fitting the locking member with the plug section screwed into the threaded aperture of the bracket section, the plug section no longer rotates and loosens. As a result the undesirable situation where liquid leaks from a loosened part of the bracket section can be reliably prevented.

DETAILED DESCRIPTION OF THE PREFERRED EMBODIMENTS OF THE PRESENT INVENTION

Hereunder is a description of a connector of the present invention, with reference to the drawings.

Figure 1:
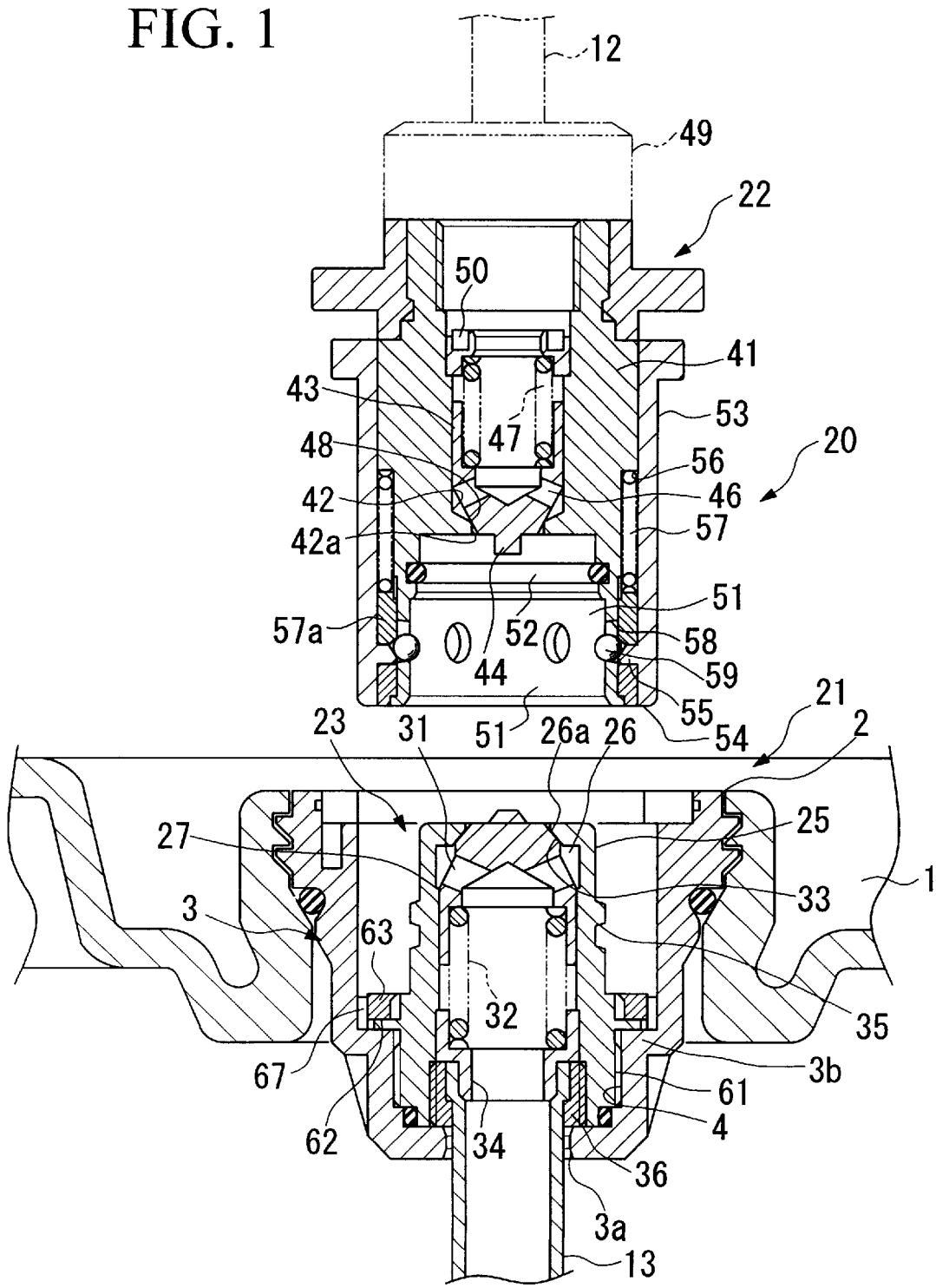
FIG. 1 is a cross-section of a plug and socket, for explaining the constituents and construction of a connector of the present invention.
Figure 2:
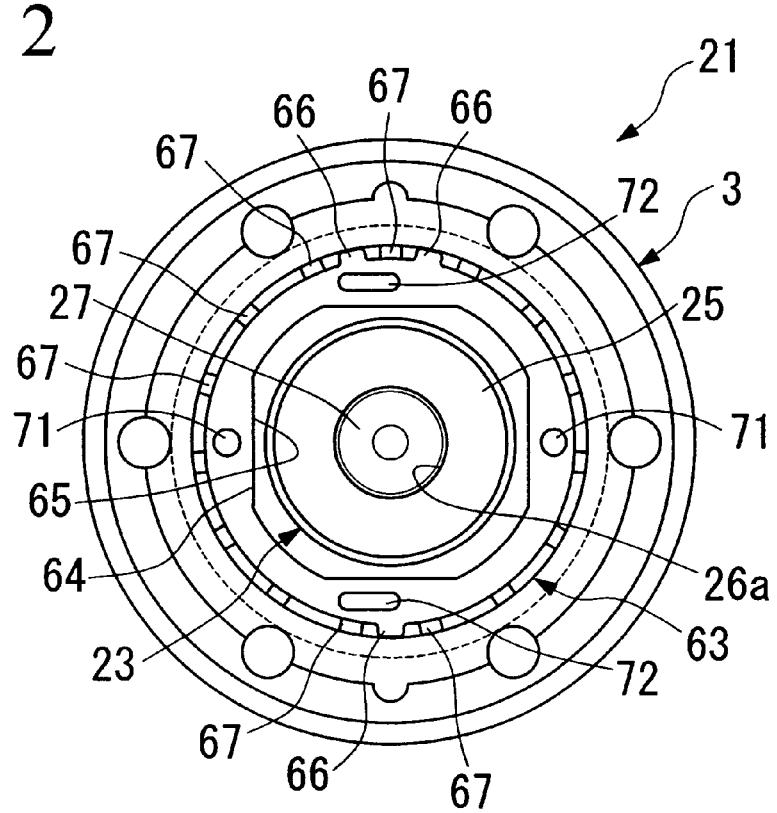
FIG. 2 is a plan view of the plug, for explaining the arrangement and configuration of the connector of the present invention.

In FIG. 1, reference symbol 20 denotes a connector. This connector 20 comprises a plug 21 fitted to an opening 2 of a container 1, and a socket 22 connected with a hose 12. The plug 21, as also shown in FIG. 2, is constructed with a plug section 23 removably fitted to a bracket section 3 which is threaded into the opening 2 of the container 1.

Next is a description of the construction and configuration of the plug section 23. Reference symbol 25 denotes a main barrel with a fluid passage 26 formed on the inside. A valve 27 is slidably provided inside the main barrel 25 in the vicinity of the tip section, and in this valve 27 is formed passages 31 communicating between the inside and outside of the valve 27.

Furthermore, a spring 32 is fitted into the rear end of the valve 27, and by means of this spring 32, the valve 27 is urged towards the tip of the main barrel 25, so that the tip vicinity of the valve 27 is abutted against a surface 33 of an opening 26a formed in the tip of the main barrel 25, to thereby close the fluid passage 26. Reference symbol 34 denotes a seal nut for engaging with the spring 32 fitted into the main barrel 25. Furthermore, in the outer peripheral face of the main barrel 25 is formed an annular groove 35 formed around the circumferential direction. At the time of connecting the socket 22 to the bracket section 25, later described locking balls 59 are engaged in this groove 35.

Furthermore, a stopper 36 is screwed into a rear end of the plug section 23, and by means of this stopper 36 and the beforementioned seal nut 34, a pipe 13 is connected with an end thereof clamped.

In the plug section 23 of the above construction, an external screw 61 is formed on an outer peripheral face at the rear side, and the pipe 13 is inserted into an insertion aperture 3a formed in the center of the bracket section 3. After this, the external screw 61 is screwed into the threaded aperture 4 formed in the bottom of the bracket section 3, to thereby fit the plug section 23 to the bracket section 3.

Furthermore, a flange section 62 is formed on the plug section 23, and this flange section 62 abuts against a step 3b formed in the bracket section 3, thereby restricting the amount that the plug section 23 is screwed into the bracket section 3.

Furthermore, a locking ring 63 is engaged with the plug section 23. Chamfer sections 64 and 65 which engage with each other are formed in the locking ring 63 and the plug section 23. As a result, by engaging the locking ring 63 with the plug section 23, circumferential rotation of the locking ring 63 is restricted so that these are integrally fitted.

Figure 3:
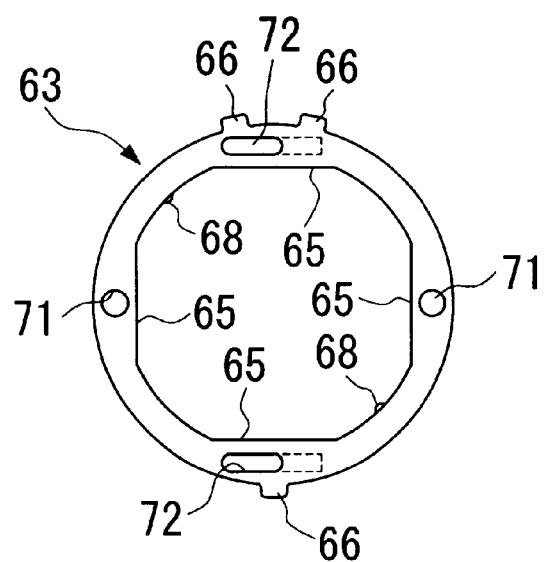
FIG. 3 is a plan view of a locking ring, for explaining a locking ring used in the plug constituting the connector of the present invention.

As also shown in FIG. 3, a plurality of lugs 66 are formed on the outer periphery of the locking ring 63. Furthermore, on the bracket section 3 are formed a plurality of engaging ribs 67 circumferentially apart in a horizontal plane the same as that of the locking ring 63, and the lugs 66 of the locking ring 63 which is engaged with the plug section 23, are arranged between engaging rib 67 pairs of the bracket section 3.

Figure 4:
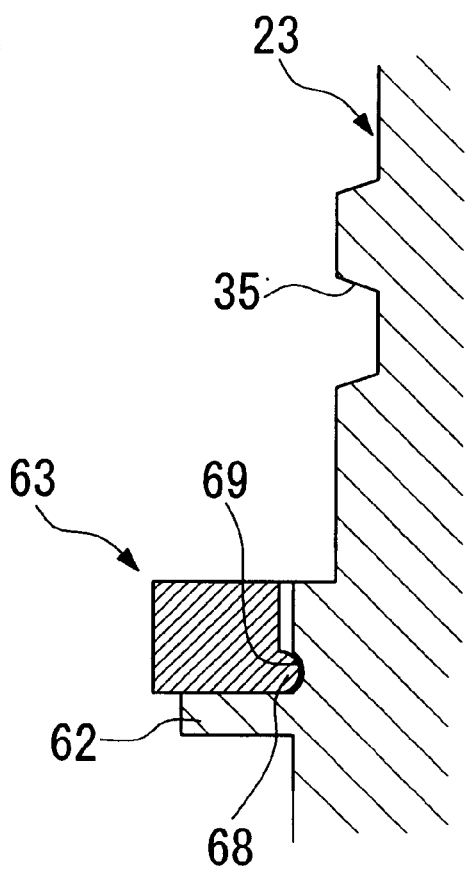
FIG. 4 is a cross-section view of part of the locking ring engaged with the plug section, for explaining the locking ring used in the plug constituting the connector of the present invention.

Furthermore, on the locking ring 63, as shown in FIG. 4, engaging protrusions 68 are formed on the inner peripheral face thereof. Moreover, in the plug section 23 an engagement groove 69 is formed around the circumferential direction for engaging with the engaging protrusions 68. Then, the engaging protrusions 68 of the locking ring 63 are resiliently deformed and engaged in the engagement groove 69 of the plug section 23.

Figure 5:
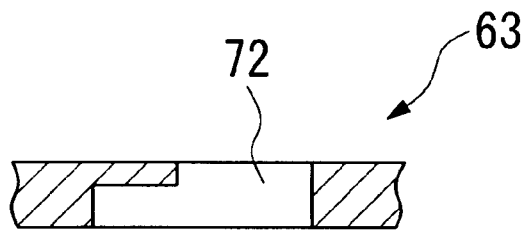
FIG. 5 is a cross-section of part of the locking ring, for explaining the locking ring used in the plug constituting the connector of the present invention.

Moreover, in the locking ring 63 is formed a pair of retention holes 71 at opposed positions so as to engage with later described engagement portions 84 of an installation tool 83. Furthermore, as shown in FIG. 5, a pair of withdrawing holes 72 are formed in the locking ring 63. These withdrawing holes 72 are formed in a L shape in cross-section, so that later described engaging portions 82 of a withdrawing tool 81 can be engaged.

Next is a description of the construction and configuration of the socket 22 which is connected to the plug section 23 of the above configuration. Reference symbol 41 denotes a main barrel with a fluid passage 42 formed inside. A valve 43 is slidably provided inside the main barrel 41. A pressing protrusion 44 is formed on the tip end of the valve 43 so that this pressing protrusion 44 protrudes from an opening 42a of the main barrel 41. Furthermore, passages 46 communicating between the inside and outside are formed in the valve 43 in the vicinity of the tip portion thereof.

Moreover, a spring 47 with an end held by a stopper 50 is provided in a rear end of the valve 43, and by means of this spring 47, the valve 43 is urged towards the tip of the main barrel 41, so that the tip vicinity of the valve 43 abuts against a surface 48 of an opening 42a formed in the tip portion of the main barrel 41 to thereby close the fluid passage 42.

Reference symbol 49 denotes an adapter fitted to the main barrel 41 for connecting a pipe 12.

Furthermore, a cavity portion 51 is formed in the tip portion side of the main barrel 41 so that the main barrel 25 of the plug section 23 can be fitted into the cavity portion 51. An O-ring 52 is inserted into the inner face side of the cavity portion 51, and when the main barrel 25 of the plug section 23 is engaged in the cavity portion 51, this seals against the outer peripheral face of the main barrel 25 of the plug section 23, so that the inner peripheral face of the cavity portion 51 and the outer peripheral face of the main barrel 25 of the plug section 23 are sealed.

Furthermore, a sleeve 53 is slidingly provided on the outer periphery of the main barrel 41, and the sleeve 53 is prevented from coming off from the main barrel 41 by means of a stop ring 54 provided on the tip portion of the main barrel 41. A protruding portion 55 is provided on the inner face side of the sleeve 53 in the vicinity of the tip portion thereof, and between this protruding portion 55 and a step 56 formed on the outer peripheral face of the main barrel 41 there is provided an urging ring 57a and a spring 57. Then, by means of the spring 57, the sleeve 53 is always urged towards the tip of the main barrel 41.

Furthermore, in the vicinity of the tip section of the main barrel 41 there is provided bowl shaped apertures 58 spaced apart around the circumferential direction, and locking balls 59 are provided in these apertures 58. Then with the sleeve 53 moved towards the rear end of the main barrel 41, the locking balls 59 are able to move away from the inner face side of the cavity portion 51 of the main barrel 41, and when the sleeve 53 is moved to the tip end side by the urging force of the spring 57, the locking balls 59 are pressed to the inner face side by the protruding portion 55 of the sleeve 53, so that they are held with a part thereof protruding from the inner face side of the cavity portion 51.

Furthermore, the bracket section 3, the plug section 23, the socket 22 and the locking ring 63 are each formed from a polytetrafluoroethylene (Teflon™) resin having excellent chemical resistance.

Figure 6:
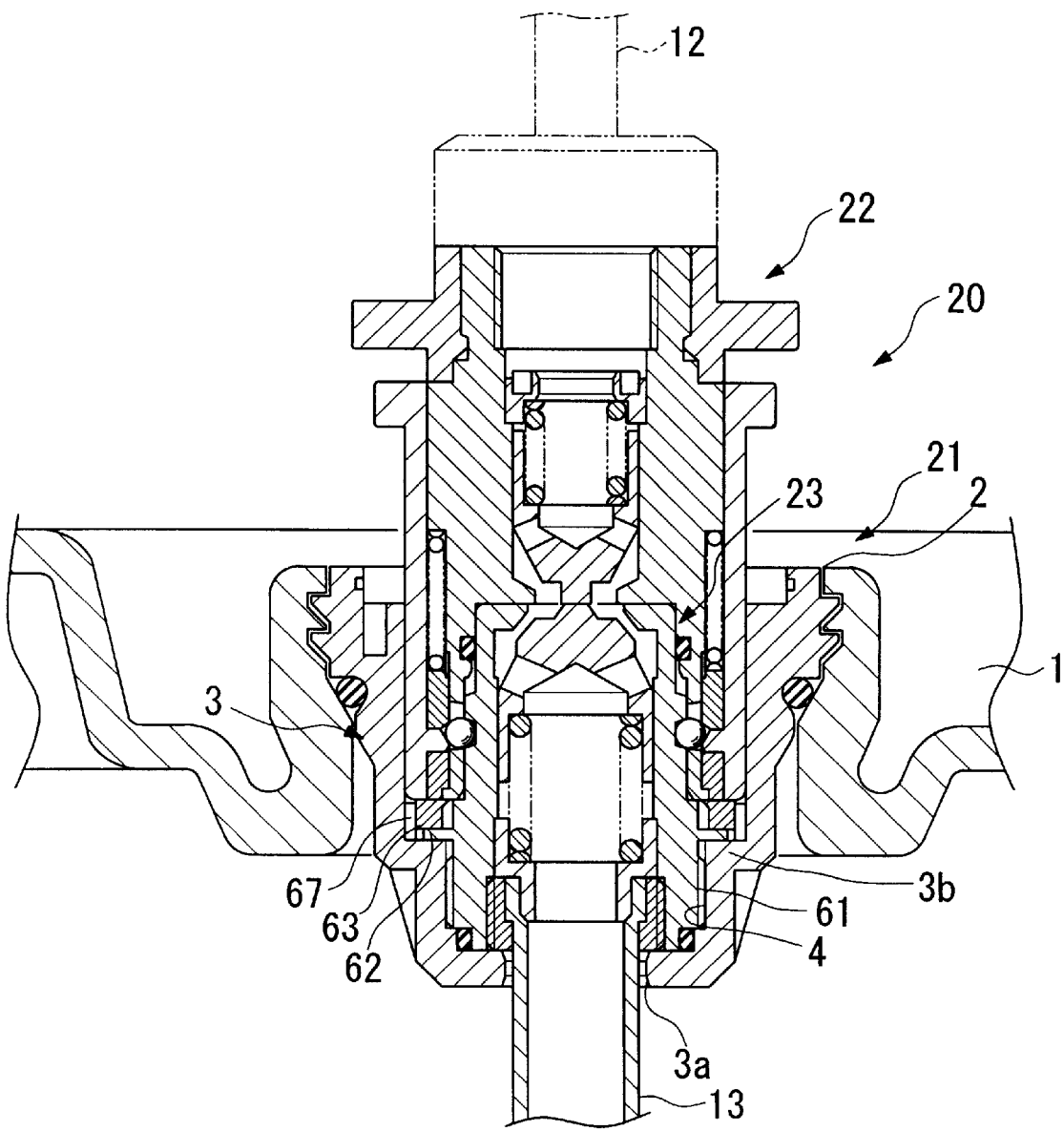
FIG. 6 is a cross-section for explaining a connection condition of the plug and socket constituting the connector of the present invention.

Then, with the connector 20 of the above construction, by pressing the socket 22 onto the plug section 23 of the plug 21, the locking balls 59 engage with the groove 35 formed in the outer peripheral face of the main barrel 25 of the plug section 23, and as shown in FIG. 6, a reliable connection condition between the plug section 23 and the socket 22 is secured with one touch. By so doing, the pressing protrusion 44 formed on the tip portion of the valve 43 of the socket 22 is abutted against the tip portion of the valve 27 of the plug section 23, and the valve pairs 27 and 43 are pushed against each other and react against the urging force of the respective springs 32 and 47 and are moved towards the rear ends of the main barrels 25 and 41 so that the paths are connected to each other.

Furthermore, by withdrawing the sleeve 53 of the socket 22 towards the rear end side, the projection of the locking balls 59 to inside the cavity portion 51 is released. As a result, the release of the connection between the connected plug 21 and socket 22 can also be performed with one touch.

Next is a description of the removal of the plug section 23 constituting the plug 21 of the connector 20 from the bracket section 3, and the case where this is newly fitted to the bracket section 3.

(Removal of the Plug Section 23)

At first the locking ring 63 engaged with the plug section 23 is removed.

Figure 7:
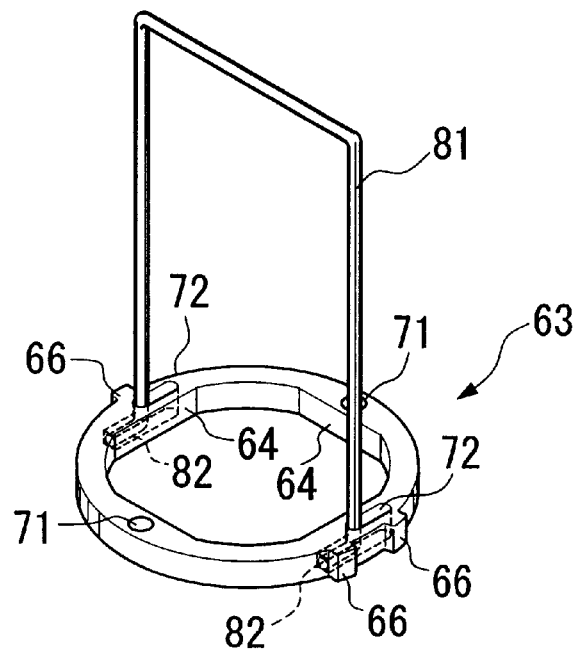
FIG. 7 is a perspective view of a locking ring connected to a withdrawing tool, for explaining a method of withdrawing from the plug, the locking ring used in the plug constituting the connector of the present invention.

In removing the locking ring 63, the withdrawing tool 81 as shown in FIG. 7 is used. This withdrawing tool 81 is a wire rod bent in a C-shape, with both ends bent back in one direction. These bent back ends constitute the engaging portions 82.

Then, in withdrawing the locking ring 63 using the withdrawing tool 81, the engaging portions 82 of the two ends of the withdrawing tool 81 are inserted from above into the withdrawing holes 72 of the locking ring 63, and are then slid in one direction. By so doing, the engaging portions 82 of the withdrawing tool 81 are engaged with the withdrawing holes 72.

In this condition, when the withdrawing tool 81 is lifted upwards, the engagement of the engaging protrusions 68 with the engagement groove 69 of the plug section 23 is released, so that the locking ring 63 is removed from the plug section 23.

Next, the plug section 23 is rotated so that the plug section 23 which is threaded into the threaded aperture 4 of the bracket section 3 is loosened and removed, and the pipe 13 connected to the plug section 23 is withdrawn from the insertion aperture 3a of the bracket section 3.

(Fitting of the Plug Section 23)

At first, the pipe 13 which is connected to the plug section 23 is inserted into the insertion aperture 3a of the bracket section 3, after which the plug section 23 is rotated and threaded into the threaded aperture 4 formed in the bracket section 3 until restricted by engagement of the flange section 62 with the step 3b.

Next, the locking ring 63 is fitted to the plug section 23 which is screwed into the bracket section 3.

Figure 8:
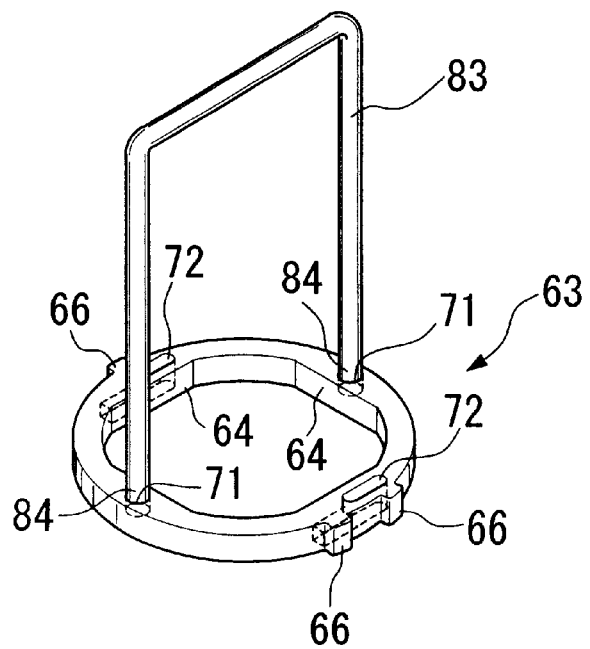
FIG. 8 is a perspective view of a locking ring held in an installation tool, for explaining a method of fitting to the plug, the locking ring used in the plug constituting the connector of the present invention.
Figure 9:
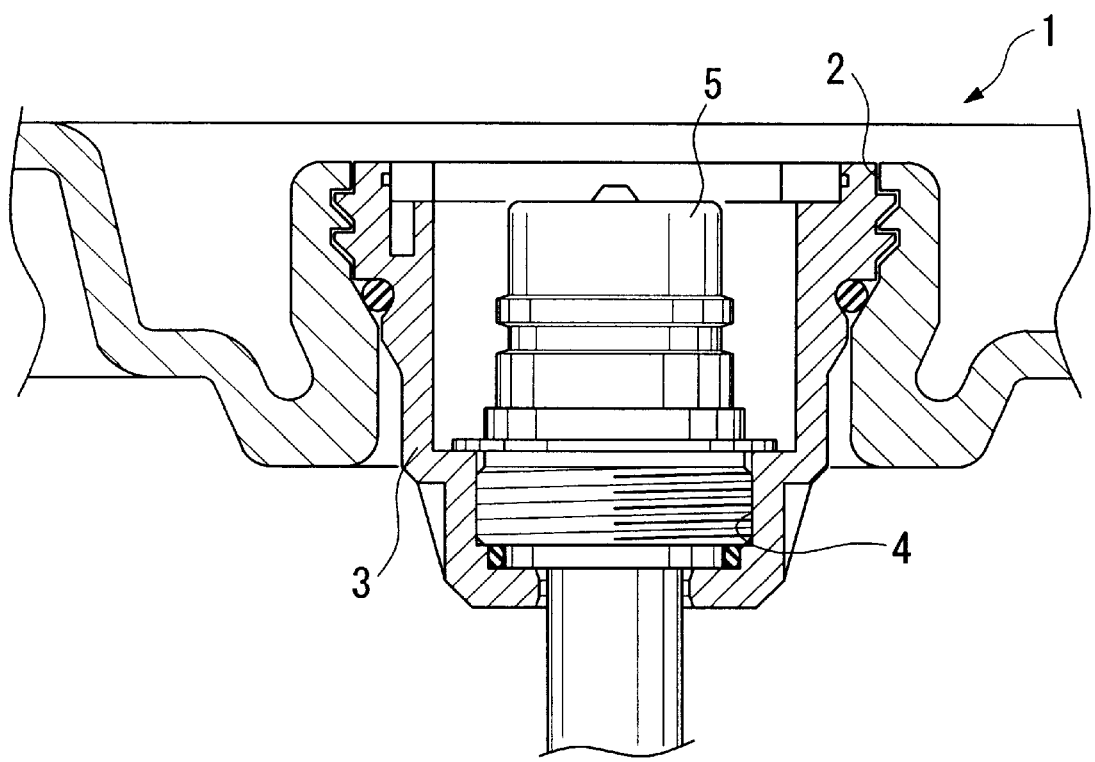
FIG. 9 is a cross-section of a plug constituting a conventional connector, for explaining the constituents and construction of the plug.

In fitting the locking ring 63 to the plug section 23, the installation tool 83 as shown in FIG. 8 is used. This installation tool 83 is a wire rod bent in a C-shape, and opposite ends of the installation tool 83 constitute engaging portions 84.

Then, in engaging the locking ring 63 with the plug section 23 using the installation tool 83, the engaging portions 84 on opposite ends of the installation tool 83 are engaged in the retention holes 71 of the locking ring 63 until these abut with the bottom thereof.

Here the spacing of the engaging portions 84 of the installation tool 83 is made a little wider than the spacing of the retention holes 71 of the locking ring 63. Consequently, in engaging the engaging portions 84 of the installation tool 83 in the retention holes 71, the installation tool 83 is squeezed at opposite end portions and resiliently deformed inwards so that the engaging portions 84 are the same spacing as the retention holes 71, and the engaging portions 84 are then engaged in the retention holes 71.

Then, when in this manner the engaging portions 84 are engaged in the retention holes 71 and the squeezing force on the installation tool 83 is released, then due to the restoring force of the installation tool 83, the respective engaging portions 84 press on part of the side faces of the retention holes 71. As a result this gives a condition where the locking ring 63 is held by the installation tool 83.

In the above manner, once the locking ring 63 is held by the installation tool 83, the locking ring 63 is inserted into the plug section 23. Then the position of the chamfer sections 64 and 65 formed on the inner peripheral face of the locking ring 63 and the outer peripheral face of the plug section 23 are aligned, and the locking ring 63 is fitted into the plug section 23 until the engaging protrusions 68 of the locking ring 63 engage with the engagement groove 69 of the plug section 23.

By so doing, the locking ring 63 is mounted on the outer periphery of the plug section 23, and the lugs 66 formed on the outer periphery of the locking ring 63 are arranged between the engaging rib 67 pairs formed on the inner peripheral face of the bracket section 3.

Then, when the locking ring 63 is engaged with the plug section 23, even if the plug section 23 is rotated in a direction to loosen from the threaded aperture 4 of the bracket section 3 through some external force, the lugs 66 of the locking ring 63 which is engaged with the outer periphery of the plug section 23, engage with the engaging ribs 67 formed on the inner peripheral face of the bracket section 3 to thereby prevent rotation of the plug section 23 in the loosening direction. As a result, loosening of the plug section 23 from the threaded aperture 4 is prevented.

Accordingly, the undesirable situation where liquid inside the container 1 leaks from a loose portion can be the reliably prevented.

Here when the locking ring 63 is fitted in the above manner, depending on the position where the plug section 23 is screwed into the threaded aperture 4, there is the case where the lugs 66 formed on the outer periphery interfere with the engaging ribs 67 of the bracket section 3 so that the locking ring 63 cannot be engaged.

However, since of the engagable positions in the circumferential direction determined by the chamfer sections 64 and 65 of the locking ring 63 and the plug section 23, the engaging ribs 67 are formed at at least one engagement position where these do not interfere with the lugs 66 of the locking ring 63, then by turning the locking ring 63 through 90 degrees steps from the position where the lugs 66 interfere with the engaging ribs 67, and again aligning with a position where the chamfer sections 64 and 65 coincide, interference of the lugs 66 with the engaging ribs 67 can be avoided, so that the locking ring 63 can be reliably engaged with the plug section 23.

In this way, according to the above described connector 20, in the construction where, so that the high cost plug section 23 can be reused, the plug section 23 connected to the socket 22 is attached and removed by being screwed into the threaded aperture 4 of the bracket section 3, since the locking ring 63 serving as the locking member for preventing rotation with respect to the bracket section 3 with the plug section 23 screwed into the threaded aperture 4 is removably fitted, then by fitting the locking ring 63 with the plug section 23 screwed into the threaded aperture 4 of the bracket section 3, the plug section 23 no longer rotates and loosens. As a result the undesirable situation where liquid in the container 1 leaks from the loosened part of the bracket section 23 can be reliably prevented.

Furthermore, the annular locking ring 63 can be mounted by an extremely simple operation involving engaging the locking ring 63 with the plug section 23 which is screwed into the threaded aperture 4 of the bracket section 3. Then, due to the mounting the locking ring 63, when the plug section 23 turns the lugs 66 of the locking ring 63 engage with the engaging ribs 67 formed on the bracket section 3 so that locking of the plug section 23 can be reliably performed.

Moreover, since there is always a position where the lugs 66 of the locking ring 63 and the engaging ribs 67 of the bracket section 3 can be engaged without interference, then when the locking ring 63 is to be engaged with the plug section 23 at some engagement position, even if the lugs 66 interfere with the engaging ribs 67 of the bracket section 3, by shifting the position where the locking ring 63 engages with the plug section 23 in the circumferential direction, the locking ring 63 can be reliably engaged with the plug section 23.

Furthermore, by engaging the locking ring 63 with the plug section 23, the engaging protrusions 68 formed on the inner face of the locking ring 63 engage with the engagement groove 69 formed on the plug section 23. Therefore an undesirable situation where the locking ring 63 engaged with the plug section 23 is accidentally removed can be obviated.

Moreover, the locking ring 63 can be held in the installation tool 83 by engaging the engaging portions 84 of the installation tool 83 comprising the wire rod bent into a C-shape, with the retention holes 71 of the locking ring 63 which is to be engaged with the plug section 23. Therefore even in the case of the above construction where the bracket section 3 is formed in a concave shape so that the gap with the plug section 23 is narrow, the locking ring 63 can be easily fitted to the plug section 23.

Moreover, the locking ring 63 engaged with the plug section 23 can be withdrawn and removed by engaging the engaging portions 82 of the withdrawing tool 81 comprising the wire rod bent into a C-shape, with the withdrawing holes 72 of the locking ring 63 which is engaged with the plug section 3, and then lifting. Therefore, the locking ring 63 can be easily withdrawn and removed from the plug section 23.

What is claimed is:

1. A connector having:
   a bracket section formed with a threaded aperture,
   a plug section threaded into said threaded aperture of said bracket section,
   a socket connected to said bracket section for communicating associated passages, and
   a locking member removably fitted between said bracket section and said plug section for preventing rotation of said plug section with respect to said bracket section with said plug section threaded into said threaded aperture.

2. A connector according to claim 1, wherein said bracket section is fitted to an opening formed in a container for containing a liquid.

3. A connector according to claim 1, wherein said locking member comprises an annular locking ring having lugs on an outer periphery, and is able to be integrally engaged with an outer periphery of said plug section, and
   a plurality of engaging ribs are formed on said bracket section so as to be circumferentially apart from each other and surround said locking ring, which is engaged with said plug section in a condition screwed into said threaded aperture for engaging with said lugs of said locking ring.

4. A connector according to claim 3, wherein said locking ring can be engaged with said plug section at a plurality of circumferential positions centered on an axis of said plug section, and said engaging ribs are formed at positions where these do not interfere with the lugs of said locking ring in at least one engagement position in the circumferential direction where said locking ring is engageable with said plug section.

5. A connector according to claim 3, wherein an engagement groove is formed in said plug section around the circumferential direction, and an engaging protrusion is formed in said locking ring on an inner face thereof, for engaging with said engagement groove at the time of engaging said locking ring with said plug section.

6. A connector according to claim 3, wherein chamfer sections for engaging with each other at the time of engaging said locking ring with said plug section, are formed in the inner peripheral face of said locking ring and the outer peripheral face of said plug section.

7. A connector according to claim 3, wherein a pair of retention holes are formed in said locking ring at opposed positions, and engagement portions of an installation tool comprising a wire rod formed in a C-shape with opposite ends constituting said engagement portions are engagable in said retention holes, and said locking ring is held by said installation tool by engaging said engagement portions of said installation tool in said retention holes of said locking ring.

8. A connector according to claim 7, wherein in said installation tool, the spacing of said engagement portions is wider than the spacing of said retention holes of said locking ring, and when said engagement portions are fitted into said retention holes, said locking ring is held by engaging said engagement portions in said retention holes by the resilient force of the wire rod constituting said installation tool.

9. A connector according to claim 3, wherein in said locking ring there is formed a pair of withdrawing holes at opposed positions, and engaging portions of a withdrawing tool being a wire rod bent in a C-shape with opposite ends formed in a hook as said engaging portions, are engagable with said withdrawing holes, and by engaging the engaging portions of said withdrawing tool with said withdrawing holes of said engaging ring and lifting, said engaging ring is withdrawn from said plug section by said withdrawing tool.

10. A connector according to claim 1, wherein on said plug section there is formed a flange section for abutting against a bottom of said bracket section to restrict the amount that said plug section is screwed into said threaded aperture.

11. A connector according to claim 1, herein said bracket section, plug section, socket section, and said locking ring each is formed from a polytetrafluoroethylene resin.

12. A connector according to claim 1, wherein in said socket section there is formed a cavity portion for fitting with said plug section, and said plug section is fitted into said cavity portion to communicate the associated passages of each.

13. A connector according to claim 12, wherein in said cavity portion of said socket section is provided locking means for holding a condition where said plug section is fitted therein with the associated passages communicated.

14. A connector according to claim 13 wherein said locking means comprises;
   a groove portion formed around the circumferential direction in an outer peripheral face of said plug section,
   apertures formed in said cavity portion of said socket section spaced apart around the circumferential direction,
   locking balls provided in said apertures and which can be protruded to an inner face side of said cavity portion, and
   an urging ring for, when said locking balls are positioned in said groove portion due to said plug section being fitted into said cavity portion of said socket section, protruding said locking balls which are positioned on the rear side of said apertures, from said apertures towards the inner face side of said cavity portion, to engage in said groove portion to thereby maintain a connection condition between said socket and plug sections.

15. A connector according to claim 14, wherein on an outer peripheral side of said cavity portion of said socket, there is provided a sleeve which by sliding in an axial direction moves said urging ring to a position away from a rear face of said apertures, so that said locking balls which are protruded into the inner peripheral face of said cavity portion are able to be withdrawn into said apertures, so that the engagement condition of said locking balls in said groove portion is released.

16. A connector according to claim 12, wherein an O-ring is provided between said cavity portion of said socket section and said plug section fitted into said cavity portion, for sealing between these.

17. A connector according to claim 16, wherein said O-ring is provided on an inner peripheral face of said cavity portion of said socket section.

18. A connector according to claim 1, wherein a valve which opens when said plug section and said socket section are connected, is provided in a flow path of said plug section and a flow path of said socket section.

19. A connector according to claim 18, wherein there is provided a spring for urging said valve towards an end portion to abut with a rim portion of a flow path opening to maintain a closed condition of the flow path, and when said plug section and said socket section are connected, said valves are abutted, so that these are separated from said rim portion of said flow path opening against an urging force of said spring so that said flow paths are opened.

20. A connector according to claim 19, wherein a protrusion is formed on an end face of said valve.

* * * * *